Oct. 3, 1967
J. E. HOGEL
3,344,798
PRESSURE TRANSDUCER
Filed April 6, 1965
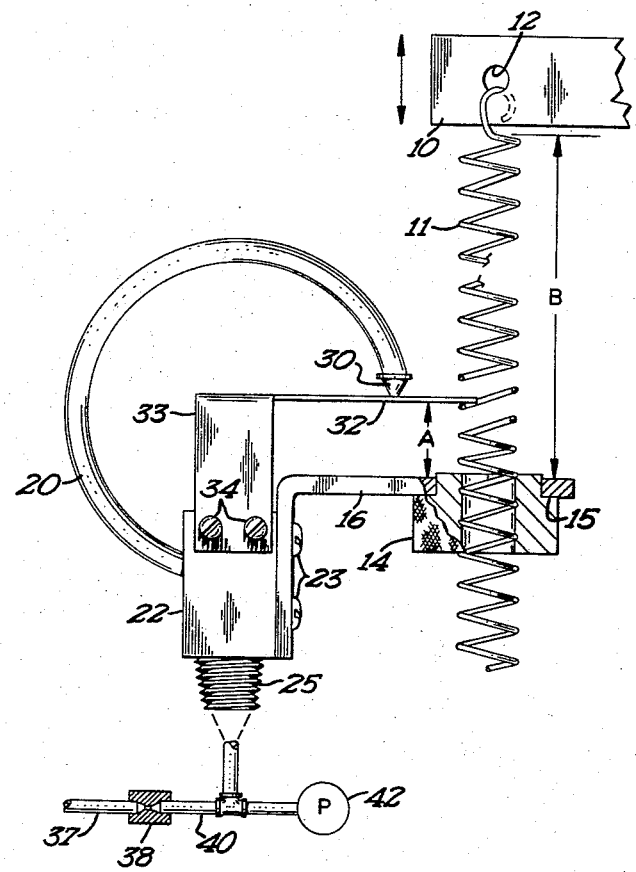
INVENTOR.
JOSEPH E. HOGEL
BY Robert S. Craig
ATTORNEY

United States Patent Office 3,344,798
Patented Oct. 3, 1967

3,344,798
PRESSURE TRANSDUCER
Joseph E. Hogel, River Grove, Ill., assignor to Honeywell Inc., Minneapolis, Minn., a corporation of Delaware
Filed Apr. 6, 1965, Ser. No. 445,945
4 Claims. (Cl. 137—85)

ABSTRACT OF THE DISCLOSURE

A pneumatic transducer that translates mechanical movement into varying pressure. Effective movement of a bleed nozzle valve is reduced by mounting the nozzle on a pressure sensitive element and by moving the flapper from an intermediate part of a spring one end of which is moved by the mechanical input.

---

The transducer is specifically intended to produce a pneumatic pressure that varies in accordance with movement of a member such as a damper or a valve. This pressure may be used to remotely indicate the operative position assumed by the damper or valve, or it may be used to actuate another motor device.

The transducer of the present invention provides means for adjusting the amount of mechanical movement necessary to produce a given change in pressure. Use is made of a bleed nozzle valve which is a type of valve that inherently produces large pressure changes with very small movements of the cooperating flat strip, commonly called a flapper. Two means are employed to reduce this relative movement to a very small fraction of the mechanical input. The first means consists of a mechanical reduction in which the mechanical input moves one end of a coil spring and a mechanical output is taken from an intermediate point on the spring to move the flapper. This motion reducing means is adjustable to select the desired ratio of input to output movements. The second means for reducing relative movement of the valve parts is a pressure feedback arrangement in which the nozzle is physically positioned by a pressure responsive element in accordance with the back pressure produced by partial closure of the nozzle. The nozzle is moved an appreciable distance as the pressure changes through the selected range, thus requiring substantial movement of the flapper strip to produce this pressure change.

The single figure of the drawing shows a pneumatic transducer adapted to be actuated by suitable motion producing means such as a damper actuator.

An arm 10, is adapted to be actuated by a mechanism, not shown, whose operative position is to be sensed by the transducer. The mechanism may be a damper or valve positioned by a modulating motor. The arm 10 will be moved vertically on movement of the damper or valve and its position will be indicative of the damper or valve opening.

A helical tension spring 11 has its upper end hooked through a hole 12 in the arm 10, while its lower end is engaged by internal threads on a nut 14. An annular shoulder 15 on the nut 14 engages a supporting plate 16 and is arranged so that the nut may be rotated in the plate 16.

A Bourdon tube 20 is carried by a fitting 22 to which the plate 16 is attached by screws 23. The fitting 22 has a screw threaded portion 25 which may serve as a provision for mounting the device as well as connecting the Bourdon tube to a branch pressure line. The free end of the Bourdon tube carries a nozzle 30 consisting of a passageway of small bore terminating at a flat surface normal to the bore as is well known in pneumatic controls of the proportioning type.

The nozzle 30 cooperates with a flat portion of a resilient strip 32 to provide a "flapper" for controlling air flow from the nozzle. The nozzle 30 and strip 32 thus provide cooperating parts of a valve adapted to regulate air flow in accordance with their physical spacing. The strip 32 is formed with an angularly bent portion 33 extending downwardly and attached to the fitting 22 by screws 34. The free end of strip 32 extends to the helical spring 11 and engages one of the turns thereof.

An air supply line 37 may carry a pressure of 18 p.s.i. to a restriction 38. The restriction 38 is connected to a branch line 40, which is, in turn, connected to the Bourdon tube 20 and to a pressure indicator 42. The indicator 42 may be calibrated in percent opening of the valve or damper, rather than in pounds. The opening through restriction 38 is so proportioned to the size of nozzle 30 that pressure in the branch line and in the Bourdon tube may be varied between 3 and 15 p.s.i. by relative movement of strip 32 and nozzle 30.

In the unstressed condition of the Bourdon tube and the strip 32, the strip is spaced from nozzle 30 by a sufficient distance so that air flow through the nozzle is unaffected by the strip. In operation, the strip 32 is deflected upwardly by the tension spring 11 so that the strip cooperates with the nozzle 30 to restrict airflow and raise the pressure in the Bourdon tube.

The arm 10 is movable vertically through a range indicative of movement of a damper or valve between predetermined portions, which may be the open and closed positions. As the arm 10 is moved, the part of the spring 11 engaged by the strip 32 will be moved a proportionally lesser amount, the ratio being in the ratio of the distances A and B shown on the drawing. With the movement of the strip 32 required to change branch line pressure between 3 and 15 p.s.i. known, as well as the total movement of the arm 10, the required spring length B can be determined to provide the proper movement of its length A.

With the arm 10 in its lowermost position the nut 14 is turned with respect to both the plate 16 and the spring 11 so that a turn of the spring engages the strip 32 and holds it positioned with respect to the nozzle 30 to restrict air flow to create a branch line pressure of 3 p.s.i. As the arm 10 is raised, the strip will move toward the nozzle 30 to increase the pressure in the Bourdon type. This pressure increase, however, tends to move the nozzle away from the strip 32 so that much more movement of the strip is required to raise branch line pressure a given amount than if the nozzle were fixed. The reverse is true on the arm 10 moving downward, as reduced pressure relaxes the Bourdon tube.

In the described embodiment of the invention the spring 10 is not materially affected by the resilience of strip 32 which may be of light gage material. However, any such effect present can be compensated for by adjustment of ratio of the lengths B and A.

While the invention has been described as providing an indication of valve or damper position, the available branch line pressure can be used to perform other control functions.

I claim:
1. A pneumatic transducer comprising, a frame, a nut rotatable in said frame, a coil spring having one portion in threaded engagement with said nut, said coil spring having a second portion axially positionable with respect to the first portion, a spring strip having a first end supported by said frame and a second end engaging said coil spring at a point between said nut and the second end thereof, a pressure responsive chamber carried by said frame and a nozzle carried by said chamber in cooperative relation with an intermediate portion of said spring strip.

2. The structure of claim 1 in which the pressure responsive chamber is a Bourdon tube having a free end on which the nozzle is carried.

3. A pneumatic transducer comprising, a frame, a coil spring having a first end in threaded engagement with said frame and a second end axially positionable with respect to said frame, a spring strip having a first end carried by said frame and a second end engaging a coil of said coil spring intermediate the ends thereof, a pressure responsive chamber carried by said frame, a nozzle positioned with respect to said spring strip by said chamber, and means including a flow restrictor for transmitting air under pressure to said chamber and said nozzle.

4. The structure of claim 3 in which the pressure responsive chamber is a Bourdon tube, the nozzle is carried on the free end thereof, and air flows through the Bourdon tube to the nozzle.

References Cited

UNITED STATES PATENTS

| | | |
|---|---|---|
| 2,356,970 | 8/1944 | Brockett. |
| 2,873,755 | 2/1959 | Whitehead _____ 137—82 X |
| 3,140,047 | 7/1964 | Holloway _____ 137—85 X |

ALAN COHAN, *Primary Examiner.*